Sept. 3, 1968  R. MICHELS ETAL  3,399,964
PROCESS FOR REGENERATING USED HYDROCHLORIC ACID
CONTAINING PICKLING LIQUORS
Filed March 6, 1967  2 Sheets-Sheet 1

United States Patent Office 3,399,964
Patented Sept. 3, 1968

3,399,964
PROCESS FOR REGENERATING USED HYDROCHLORIC ACID CONTAINING PICKLING LIQUORS
Rudolf Michels, Frankfurt am Main, Heinrich Welling, Essen-Heidhausen, and Dieter Ueberle, Frankfurt am Main, Germany, assignors to Mettallgesellschaft Aktiengesellschaft, Frankfurt am Main, Germany
Continuation-in-part of application Ser. No. 511,455, Dec. 3, 1965. This application Mar. 6, 1967, Ser. No. 620,871
Claims priority, application Germany, Jan. 30, 1965, M 63,989; Apr. 17, 1965, M 64,908; Mar. 11, 1966, M 68,734
13 Claims. (Cl. 23—154)

ABSTRACT OF THE DISCLOSURE

Process for regenerating used hydrochloric acid and iron chloride containing pickling liquors wherein the used liquor is preconcentrated and then evaporated to dryness and the iron chloride therein decomposed with hot oxygen containing gases in a fluidized bed of inert material to produce $Fe_2O_3$ and gaseous HCl, recovering the $Fe_2O_3$, contacting the hot gases and vapor mixture leaving the fluidized bed with the used liquor to effect the preconcentration and passing the gases and vapors from the preconcentration step through an absorber supplied with used pickling liquor to absorb the HCl contained therein to strengthen it for reuse. The gases and vapors employed for the preconcentration contain traces of $Fe_2O_3$ supplying trivalent iron in the preconcentrate supplied to the fluidized bed. Water, preferably, rinse water obtained by washing the pickled ferrous articles to remove adherent pickling components, is preferably supplied to the preconcentration and absorption steps for temperature control.

Cross-reference to related application

This application is a continuation-in-part of our copending application S.N. 511,455, filed Dec. 3, 1965, now abandoned.

Background of the invention (1) *Field of the invention.*—The invention relates to an improved process for the regeneration of used hydrochloric acid containing pickling liquors.

(2) *Description of the prior art.*—The pickling of iron with acids, such as, sulfuric acid or hydrochloric acid to remove adhering oxide layers or scale before being subjected to other surface treatments has been practiced for some time. In both instances a regeneration of the used pickling acid is necessary. Essentially, three methods have become known for the regeneration of used hydrochloric acid pickling liquors. One of such methods involves saturation of the used pickling liquor with gaseous HCl and separation of the resulting precipitated $FeCl_2$, for instance, by centrifuging and its decomposition to form HCl and $Fe_2O_3$ in an indirectly heated multi-bed furnace with the addition of steam. The HCl which is thus formed is used to saturate additional used pickling liquor. This method has the disadvantage that strong corrosion occurs, mainly in the salt separation operation and in the indirectly heated multi-bed kiln.

Another of such methods, which is known as the K method, involves substantial concentration of the used pickling liquor by evaporation to produce a wet pulp of precipitated salt which is not separated off before being roasted in a multi-bed furnace. The steam and HCl containing exhaust gases produced by the roasting are fed to an absorber to the top of which a portion of the used pickling liquor is suplied so that the HCl content of such used liquor is increased. This method has the advantage that the requirements for fresh make up water are quite low. On the other hand, it is rather susceptible to breakdowns which primarily are caused by breakdown of the discharging apparatus for the furnace and clogged pipes and valves. It furthermore is difficult to maintain uniform temperature in all locations at all times so that careful operation by highly trained personnel is required.

In the other of such methods for the regeneration of HCl, which is known as the S method, the used pickling liquor is sprayed in the form of fine droplets into the top of an empty kiln without previous evaporation. The droplets as they descend are first heated to boiling temperature and then evaporated to dryness by the gases from a burner. The $FeCl_2$ which remains as the residue as it slowly continues the descent is heated to 300–600° C. and roasted to form $Fe_2O_3$ and HCl gas. This method is still in the stage of development and has not as yet proved satisfactory on a commercial scale. It is expected to have the advantage of elminating clogging as there are no obstructions in the roasting kiln. In addition, there are no movable parts in the kiln and a better utilization of heat is to be expected because of the direct heat exchange.

On the other hand, it is already apparent that the short residence time which can be obtained in the empty spray-fed kiln will hardly be sufficient to ensure a complete decomposition in a single pass through the kiln. If the partly roasted materials is to be recirculated to the kiln, the advantages residing in the simplicity, the absence of moving parts, and the like, would be eliminated.

Summary of the invention

According to the invention used hydrochloric acid pickling liquor containing iron chloride is subjected, in direct heat exchange, with hot gases in a contact chamber to evaporate a portion thereof to produce a preconcentrate in which the iron chloride concentration preferably is almost at its saturation point and such preconcentrate is then supplied to a fluidized bed of inert particulate solids maintained with an oxygen containing fluidizing gas in a reactor and heated therein to evaporate it to dryness and decompose the iron chloride contained therein to form gaseous HCl and solid iron oxide, separating iron oxide from the hot hydrogen chloride containing gases leaving the top of the fluidized bed and absorbing the hydrogen chloride from such gases. Preferably the hot gases leaving the fluidized bed after recovery of iron oxides therefrom are supplied to the contact chambers to supply heat for the preconcentration of the used pickling liquor and then passed through an absorber for absorption of the hydrogen chloride contained therein. Also, preferably the rate of flow of the hot gases leaving the top of the fluidized bed and the size of the inert particulate solids are such that substantially all of the iron oxide formed in the fluidized bed is entrained by such hot gases.

According to the invention it was furthermore found that the occurrence of too high a temperature in the contact chamber in which the used pickling liquor is preconcentrated, as well as the following portions of the apparatus, including the absorber and connecting conduits, caused by variations in operation or inadvertence of operation personnel may give rise to damage and can be avoided by the introduction of water into the contact apparatus and/or absorber to control the temperatures therein. Preferably, wash water obtained when the pickled ferrous metal articles are rinsed to remove adhering pickling liquor can be employed for this purpose.

Brief description of the drawings

In the accompanying drawings.

Figure 1:
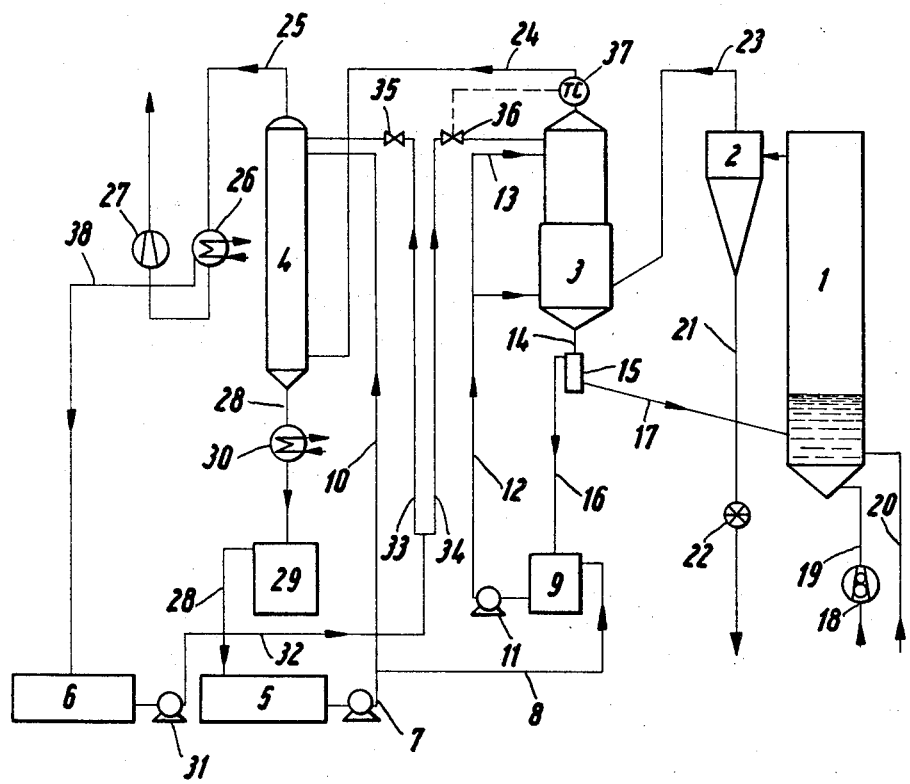
FIG. 1 is a flow diagram illustrating, by way of example, an embodiment of the process according to the invention.

Detailed description of the invention including preferred embodiments thereof

In the process according to the invention hydrochloric acid is recovered from used hydrochloric acid pickling liquors which have been used in a bath for pickling ferrous metal articles and contains dissolved $FeCl_2$ in apparatus which essentially consists of a fluidized bed reactor 1, a dust separator 2, for example, a cyclone, a preconcentrator 3 (contact chamber) and an absorber 4.

The iron oxide which is separated off from the gases leaving the fluidized bed reactor 3 in the dust separator 2 is recovered in the form of granular $Fe_2O_3$ with an apparent bulk density (poured weight) of 1.5 to 1.6 kg./liter. The chlorine content of this $Fe_2O_3$ of less than 0.1 wt. percent and even in some instances of less than 0.03 wt. percent is very low.

It has been found that $Fe_2O_3$ is only obtained in such granular form with an apparent bulk density of 1.5 to 1.6 kg./liter and a chlorine content below 0.1 wt. percent when the thermal decomposition of hydrochloric acid and iron containing used pickling liquors in the presence of oxygen is carried out in a fluidized bed in the presence of traces of tri-valent iron.

In the process according to the invention these necessary traces of tri-valent iron are provided automatically in the used pickling liquor supplied to the fluidized bed reactor in that it is supplied thereto in the form of a preconcentrate obtained by contact of the used pickling liquor with the hot gases leaving the fluidized bed after removal of $Fe_2O_3$ therefrom, for example, in a cyclone. The hot gases leaving the cyclone still contain traces of $Fe_2O_3$ and this is washed out of such gases by and dissolved in the pickling liquor being preconcentrated. Upon dissolution it forms $FeCl_3$ and therefore provides the necessary traces of tri-valent iron in the preconcentrate supplied to the fluidized bed reactor.

For reasons of heat economy it is expedient that the preconcentration of the used pickling liquor in the preconcentrator is such that the concentration of the salts dissolved in the preconcentrate produced is almost at the saturation point. However, if only a less drastic concentration is effected in the preconcentrator by direct contact with the hot gases derived from the fluidized bed reaction, a sufficient amount of iron in tri-valent form is still provided in the preconcentrate that upon decomposition in the fluidized bed reaction a granular $Fe_2O_3$ with high apparent bulk density and low chlorine content is obtained.

The process according to the invention will be more fully explained by way of example with reference to the drawings.

Referring to FIG. 1, a stream of HCl and iron containing used pickling liquor is withdrawn from the pickling path 5 with the aid of pump 7. A portion of such stream is supplied to storage vessel 9 over conduit 8 whereas the other portion thereof is supplied to absorber 4 over conduit 10. The used pickling liquor is withdrawn from vessel 9 with the aid of pump 11 and supplied to the preconcentrator 3 over conduit 12. The preconcentrator can be filled with filling bodies or similar arrangements or be empty. It has been found expedient to supply the used pickling liquor to the preconcentrator at several locations. For example, one portion can be supplied to the lower portion of the preconcentrator and the other portion to the upper portion thereof through conduit 13. The preconcentrated used pickling liquor leaves the preconcentrator through conduit 14 and first flows into intermediate vessel 15 which is provided with an overflow conduit 16 through which excess preconcentrate flows back into storage vessel 9. The preconcentrate is supplied to the fluidized bed reactor 1 from vessel 15 over conduit 17. A fluidized bed of inert material, for example, sea sand, is maintained in the bottom portion of the fluidized bed reactor with the aid of air or other oxygen containing gas which is supplied by blower 18 through conduit 19. In order to provide the necessary decomposition temperature of 500 to 900° C., preferably about 800 to 900° C., a suited gaseous or liquid fuel is supplied to the fluidized bed reactor through conduit 20. With suitable shaft like construction of the fluidized bed reactor and suitable selection of the inert material used for the fluidized bed, it is possible to retain the particles of such inert material in the fluidized bed reactor and only have the hot decomposition and combustion products leave the top of said reactor. Preferably, the inert material, such as, sea sand, has a particle size which is as uniform as possible so that the optimum conditions for a uniform fluidization and a good heat transfer can be maintained more easily. In addition, the particle size of this inert material is preferably selected so that it is larger by at least one power of ten and preferably several powers of ten than the diameter of the metal oxide particles produced by the decomposition of the pickling liquor so that these particles can easily be separated and can be quantitatively discharged together with the gases resulting from the roasting. Uniform particle sizes in the range of about 0.2 to 2 mm. have proved very satisfactory. The hot gases containing the $Fe_2O_3$ produced leaving the fluidized bed reactor are supplied to dust separator 2 which preferably is a cyclone. The granular $Fe_2O_3$ produced according to the invention is separated from the hot gases in such separator and removed through conduit 21 and discharge arrangement 22 which, for example, can be in the form of a bucket wheel sluice. The gases and vapors leaving dust separator 2 are supplied to preconcentrator 3 over conduit 23, preferably at about 500 to 800° C. in which they effect a preconcentration of the used pickling liquor while losing the greater portion of their sensible heat and are freed practically completely from any solid particles entrained therewith, primarily small quantities of entrained $Fe_2O_3$, by the direct contact with the used pickling liquor, thereby providing the desired tri-valent iron content in the preconcentrate supplied to the fluidized bed reactor. The gas-vapor mixture leaving preconcentrator 3 is supplied to the absorber 4 over conduit 24. The stream of used pickling liquor supplied to the absorber through conduit 10 absorbs the HCl contained in the gas-vapor mixture and is strengthened thereby. The exhaust gases leaving the absorber 4 through conduit 25 are exhausted to the atmosphere with the aid of blower 27 after passage through cooler 26. The strengthened pickling liquor leaving absorber 4 over conduit 28 is returned to the pickling bath 5. Expediently a storage vessel 29 is provided between the absorber and the pickling bath. If necessary the strengthened pickling liquor is cooled to the temperature prevailing in the pickling bath with the aid of cooler 30. This cooler is not necessary if corresponding heat losses occur in the pickling bath.

The fluidized bed reactor is provided with a refractor and acid resistant lining. However, generally the preconcentrator and following conduits and apparatus are only lined or constructed to resist lower temperatures. The conduits, for example, are usually rubber lined. As a result, there is the danger that the apparatus and conduits following the dust separator may be damaged by temperatures which are too high caused by variations in the operation or by inadvertence of the operating personnel.

It was found that such damage could be reliably avoided in a simple manner according to a special embodiment of the process according to the invention. According to this embodiment water from the rinsing bath which usually follows the actual pickling bath and serves to wash off pickling liquor adhering to the pickled articles is employed to provide the desired temperature control by supplying streams thereof to the absorber and the preconcentrator. A portion of the rinsing bath water supplied to the absorber is evaporated and taken off with the other gases and vapors. The condensate formed in the cooler following the absorber is preferably returned to the rinsing bath but can also be used in other ways. Such use of the rinsing water renders it possible to provide a reliable control of the temperatures in the absorber and preconcentrator. In addition it serves to solve the waste water problem from the rinsing bath as the concentration of impurities introduced by the rinsing of the pickled articles therein cannot exceed a certain amount and therefore must be replaced batchwise or continuously with fresh water. If the portion of the rinsing bath is to be discharged into the sewer it must first be neutralized.

The temperatures prevailing in the preconcentrator and absorber are regulated by the quantity of rinsing water supplied thereto and maintained thereby below that at which material damage occurs. If the temperature rises in the preconcentrator or absorber, for example, through fluctuations in the operation, more rinsing water is supplied, if the temperature drops the quantity of rinsing water supplied is reduced.

In such instances in which no rinsing bath water is easily available, other suited water can be used for regulation of the temperature. The use of ordinary water from other sources is especially advantageous when the plant for processing the used hydrochloric acid containing pickling liquors is not in the same location as the pickling plant. In such instance the used pickling liquors from several pickling plants can be processed in a single processing plant, the used pickling liquor being delivered thereto and the recovered aqueous HCl being returned to the individual pickling plants. Expediently such a processing plant for used pickling liquor is operated in conjunction with a larger pickling plant and so arranged that used pickling liquors from other sources can also be processed.

This special embodiment of the invention wherein the temperatures in the preconcentrator and absorber are regulated by the supply of water thereto is illustrated in the drawings with the use of rinsing bath water for such purpose.

As shown in the drawings rinsing bath water is withdrawn by rinsing bath 6 with the aid of pump 31 and supplied over conduit 32 to conduits 33 and 34. Conduits 33 and 34 are provided, for example, with valves 35 and 36 for the regulation of the quantities of rinsing water supplied to the preconcentrator 3 and the absorber 4. In normal operation the quantity of rinsing water supplied to the preconcentrator depends upon the degree of preconcentration of the used pickling liquor desired. If the temperature rises in the preconcentrator valve 36 can be opened further to supply more rinsing water to the preconcentrator. If the temperature sinks the valve can be closed to restrict the quantity of rinsing water supplied.

Preferably valve 36 is in the form of an automatic regulating valve which is regulated by the control apparatus 37 depending upon the temperature prevailing in the preconcentrator.

The rinsing water preferably is supplied to the preconcentrator above the point where the used pickling liquor is supplied and can, for example, be evenly distributed in the upper portion of the preconcentrator through a sprinkler. The rinsing water supplied to the preconcentrator practically completely evaporates and is drawn off together with the gas vapor mixture through conduit 34.

The rinsing water which is supplied to absorber 4 over conduit 33 is also, for example, distributed uniformly in the top portion thereof by a sprinkler. The vapors which rise in the absorber are rewashed by the rinsing water supplied and thereby practically completely freed of HCl. A portion of the rinsing bath supplied also evaporates and leaves the absorber 4 with the other exhaust gases through conduit 25. The ratio of the quantity of rinsing water supplied and of the used pickling liquor supplied to the absorber preferably is such as to ensure absorption of practically all of HCl in the gases supplied to the absorber and that the pickling liquor withdrawn from the bottom of the absorber is of the desired concentration for reuse. The water vapor contained in the exhaust gases is condensed in cooler 26 and the water recovered returned to rinsing bath 6.

The quantity of used pickling liquor and rinsing water supplied to absorber 4 respectively through lines 10 and 33 are so regulated with respect to each other that the desired temperature is maintained in the absorber and that in addition the regenerated pickling liquor or hydrochloric acid solution flowing out of the absorber contains the entire quantity of the HCl which is set free in the fluidized bed reactor as well as that introduced by the rinsing water.

Water can be used as the cooling medium for coolers 26 and 30 and subsequently can be used for supplementing the pickling bath or rinsing bath or any other washing waters or baths.

As has already been indicated, if no rinsing water is available, the same temperature regulation in the preconcentrator and absorber and avoidance of damage thereto as well as the following conduits and apparatus can be achieved with additional water from other sources. Such water is recovered as a condensate in cooler 26 and can be used for other purposes. It also is possible to effect control of the temperature in the preconcentrator and absorber as well as the following apparatus parts to a certain extent by supplying more used pickling liquor to the preconcentrator 3 through conduit 13. The additional quantity of used pickling liquor supplied is returned to vessel 9 over the overflow conduit 16.

Figure 2:
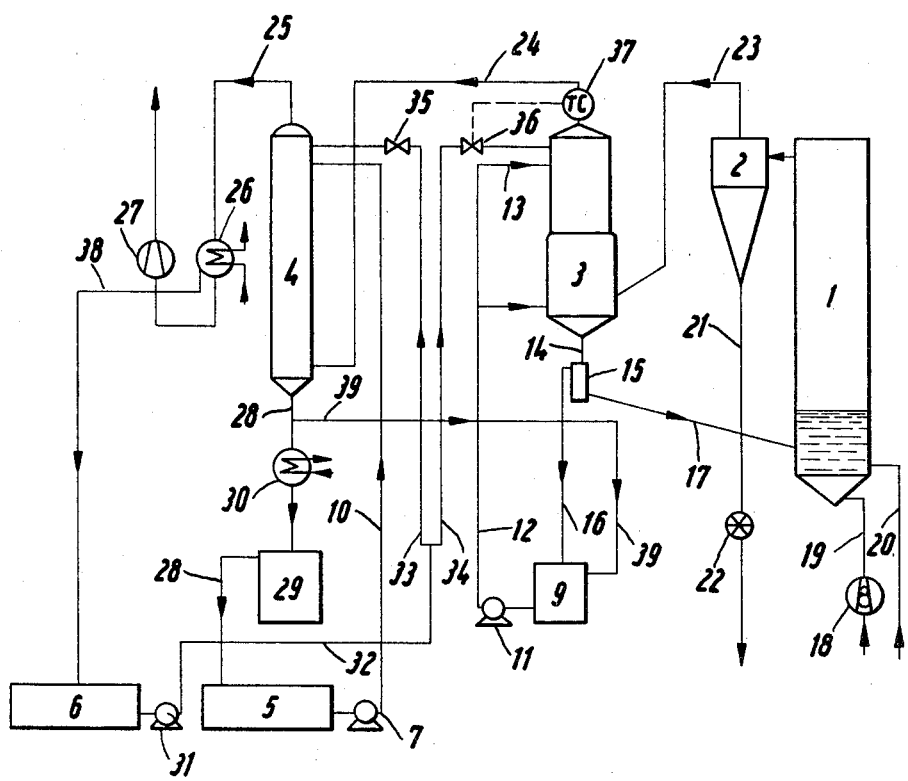
FIG. 2 is a flow diagram illustrating, by way of example, another embodiment of the process according to the invention.

FIG. 2 shows an arrangement similar to that of FIG. 1 and only differs therefrom in that all of the used pickling liquor taken from pickling bath 5 is supplied by pump 7 over conduit 10 to the head of absorber 4 where it in addition to absorbing HCl also is heated up. A portion of the pickling liquor which has been preheated and strengthened by absorption of the HCl leaving absorber 4 through conduit 28 is then supplied to storage vessel 9 over conduit 39. As a result the used pickling liquor supplied to the preconcentrator 3 for preconcentration and to the fluidized bed reactor 1 has first been passed through absorber 4. The preheating of the used pickling liquor effected in absorber 4 prior to its introduction into preconcentrator 3 provides a further saving in heat energy.

It also is possible to utilize a portion of the heat contained in the decomposition and combustion products drawn off through conduit 23 for preheating the oxygen containing combustion or fluidizing gas supplied to the fluidized bed reactor for combustion and for fluidizing the bed of inert particles.

The following example will serve to illustrate the process according to the invention.

EXAMPLE

In an arrangement analogous to that shown in FIG. 1, 1000 liters of used pickle liquor with an HCl content of 10 wt. percent and an Fe content of 80 g./liter were taken from the pickling bath and supplied to preconcentrator 3 over storage vessel 9. Simultaneously 200 liters/hour of rinsing water from rinsing bath 6 were distributed in the head portion of the preconcentrator. 40% of the water supplied by the used pickling liquor and the 200 liters per hour of the rinsing bath supplied were evaporated in the preconcentrator. The remaining water in the preconcentrate supplied to the shaft shaped fluidized bed reactor 3 was evaporated and the decomposition of the pickling liquor components was effected at 800° C. in such fluidized bed reactor. Sea sand was used as the inert material for the fluidized bed. The temperature required for the evaporation and decomposition was maintained by the supply of 85 kg./hour of fuel oil and 1000 Nm.³/hour of air. 114 kg./hour of $Fe_2O_3$ were recovered in cyclone 2. The apparent bulk density thereof was 1.6 kg./liter and its chlorine content 0.038 wt. percent. The temperature of the gases and vapors drawn off from cyclone 2 and supplied to preconcentrator 3 was 700° C. The temperature of the gases and vapors drawn off from preconcentrator 3 and supplied to the bottom portion of absorber 4 was 120° C. 1000 liters/hour of used pickling liquor at a temperature of 50° C. and an HCl content of 10 wt. percent, as well as, 450 liters/hour of rinsing water were supplied to the absorber. 5000 liters/hour of pickling liquor at a temperature of 90° C. and an HCl content of 12 wt. percent flowed out of the absorber through conduit 28. The thus regenerated pickling liquor was cooled to the pickling bath temperature in cooler 30. 630 liters/hour of condensed water were recovered in cooler 26.

We claim:

1. A process for the recovery of hydrochloric acid from a hydrochloric acid pickling liquor used in a pickling bath for pickling ferrous metal articles, and which contains dissolved iron chloride which comprises subjecting said liquor to direct heat exchange with hot gases in a column until a sufficient quantity has evaporated to produce a preconcentrate in which the concentration of the iron chloride is substantially increased but still is below its saturation point, supplying said preconcentrate to a fluidized bed of inert solid particles maintained with an oxygen containing fluidizing gas and heating said preconcentrate therein to evaporate it to dryness and decompose the iron chloride contained therein to form gaseous HCl and solid $Fe_2O_3$, recovering the $Fe_2O_3$ and absorbing HCl from the HCl containing gases leaving the top of the fluidized bed in an absorber.

2. The process of claim 1 in which the sizes of the inert solid particles is such and the rate of flow in the HCl containing gases leaving the top of the fluidized bed is sufficient to entrain substantially all the $Fe_2O_3$ formed therewith and such hot HCl containing gases after recovery of the iron oxide therefrom are employed as the hot gases used to preconcentrate the hydrochloric acid pickling liquor in said column.

3. The process of claim 2 in which used hydrochloric acid pickling liquor is employed to absorb HCl from the gases leaving the column in the absorber.

4. The process of claim 2 in which the hot HCl containing gases supplied to said column still contain traces of the $Fe_2O_3$ formed in the fluidized bed to provide sufficient trivalent iron in the preconcentrate supplied to the fluidized bed that the $Fe_2O_3$ recovered is in granular form and has an apparent bulk density of 1.5–1.6 kg./liter and a chlorine content of less than 0.1%.

5. The process of claim 2 in which additional water is supplied to the preconcentration column to control the temperature therein.

6. The process of claim 2 in which additional water is supplied to the absorber to control the temperature therein.

7. The process of claim 3 in which additional water is supplied to the absorber to control the temperature therein and the ratio of the used hydrochloric acid pickling liquor and the additional water supplied to the absorber is such that practically all of the HCl is absorbed from the gases supplied to the absorber and that the hydrochloric acid pickling liquor containing the absorbed HCl leaving the absorber has the desired composition.

8. The process of claim 5 in which the additional water is in the form of rinsing water obtained from a rinsing bath employed to wash ferrous articles pickled with a hydrochloric acid pickling bath.

9. The process of claim 6 in which the additional water is in the form of rinsing water obtained from a rinsing bath employed to wash ferrous articles pickled with a hydrochloric acid pickling bath.

10. The process of claim 2 in which a portion of the heat content of the hot gases leaving the fluidized bed after recovery of iron oxide therefrom and before contact with the used pickling liquor is employed for preheating the oxygen containing fluidizing gas.

11. The process of clam 3 in which preheated used hydrochloric acid pickling liquor is supplied from the absorber to the preconcentrating column.

12. The process of claim 2 in which the temperature of the hot gases supplied to the column for direct heat exchange with said used pickling liquor is between about 500 and 900° C. and the temperature of the hot gases leaving the fluidized bed is between about 500 and 800° C.

13. The process of claim 2 in which the particle size of the inert particulate solids of the fluidized bed is uniform and between about 0.5 and 2 mm.

References Cited

UNITED STATES PATENTS

| | | | |
|---|---|---|---|
| 2,592,580 | 4/1952 | Loevenstein | 23—154 XR |
| 2,771,344 | 11/1956 | Michel et al. | 23—154 XR |
| 2,828,187 | 3/1958 | Evans et al. | 23—202 |
| 2,950,180 | 8/1960 | Kunzer et al. | 23—154 XR |
| 2,964,386 | 12/1960 | Evans et al. | 23—202 |

FOREIGN PATENTS

| | | |
|---|---|---|
| 742,195 | 12/1955 | Great Britain. |
| 542,081 | 6/1957 | Canada. |
| 877,066 | 9/1961 | Great Britain. |

OSCAR R. VERTIZ, *Primary Examiner.*

EDWARD STERN, *Assistant Examiner.*